Aug. 26, 1969 D. M. PEEBLES 3,463,353

NESTING CONTAINER ASSEMBLY

Filed May 21, 1968

INVENTOR.
DAVID MEADE PEEBLES

BY B.P. Fishburn Jr.

ATTORNEY

United States Patent Office 3,463,353
Patented Aug. 26, 1969

3,463,353
NESTING CONTAINER ASSEMBLY
David Meade Peebles, 321 Marcy Ave.,
Oxon Hill, Md. 20021
Continuation-in-part of application Ser. No. 630,086,
Apr. 11, 1967. This application May 21, 1968, Ser.
No. 730,800
Int. Cl. B65d 21/02, 1/24
U.S. Cl. 220—97     3 Claims

ABSTRACT OF THE DISCLOSURE

A plurality of separately formed containers adapted to be stacked in nested relation so as to constitute a unit, and a common carrying handle for the unit enabling the plural containers to be carried without accidental separation and allowing purposeful separation at any time.

Cross-reference to related application

This application is a continuation-in-part of my prior copending application Ser. No. 630,086, filed Apr. 11, 1967, now Patent No. 3,392,874 for Container Stack With Common Carrying Handle.

In the aforesaid application, it was pointed out that there is a distinct need for an inexpensive compartmentized container means for use by maintenance personnel in apartments, motels, hospitals and the like, where small tools and a variety of replacement parts must be carried about on the daily rounds of such personnel. Usually, only expensive tool boxes and certain utility carts of expensive construction have been available for this purpose and it is the aim of the invention herein and in said prior application to provide a much more economical means for satisfying the above need while still attaining the objective of maintaining the various tools and small parts in an orderly and segregated manner.

The present invention is an improvement on and simplification of the container structure in said prior application. In the prior application, each container in the stack of plural containers was equipped with a separate carrying handle and the several handles were of decreasing length from the lowermost to the uppermost container whereby, in assembled relationship, the several handles formed a common carrying handle for the unit. In the present improvement, a single handle means is constructed in a unique manner and cooperates with the plural container structure to provide a common carrying handle therefor when the containers are nested or stacked.

Summary of the invention

A plurality of tray-like open top receptacles are constructed for easy nesting or stacking and ready separation. Each receptacle has a central divider wall forming a pair of compartments on opposite sides of the divider wall. The divider wall is hollow and each such wall has a top opening with the several openings aligned for the reception of an elongated common carrying handle. The common handle extends into the divider wall of an uppermost receptacle which also has an integral handle extension.

Description of the preferred embodiment

Figure 1:
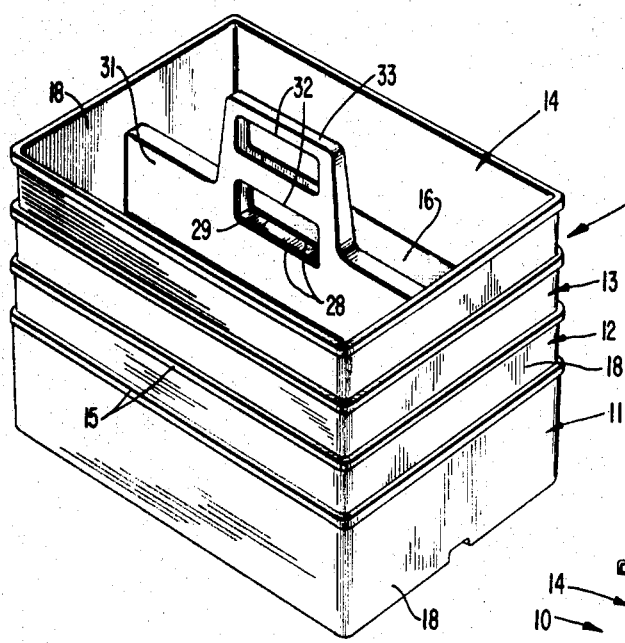
FIGURE 1 is a perspective view of a container assembly embodying the invention.

Referring to the drawings, wherein like numerals designate like parts throughout the same, the numeral 10 designates a container assembly or stack in its entirety constituting a unit which may be readily carried from place-to-place without separating the individual containers 11, 12, 13 and 14 until it is desired to do so.

The assembly 10 may consist of any practical number of open top rectangular tray-like receptacles arranged in nested stacked relation, as shown. The individual containers are well adapted to be molded from a semi-rigid plastic or the like, although the material may be varied as found desirable for particular applications.

Figure 2:
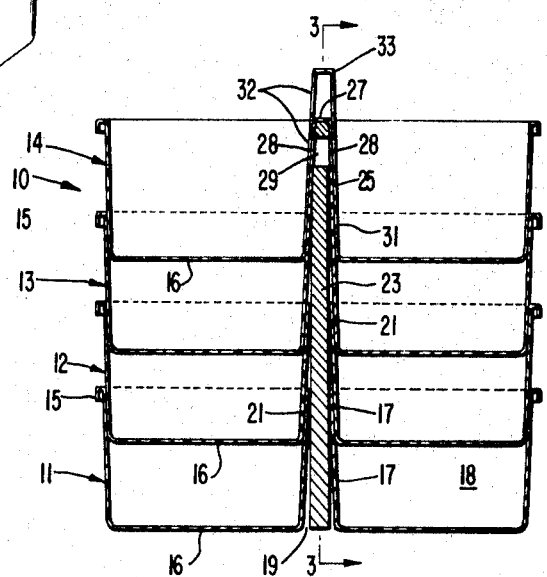
FIGURE 2 is a vertical section taken on line 2—2 of FIGURE 3.

The several lower containers of the assembly, such as the containers 11 and 12 in the drawings, are identical and each comprises a rectangular open top tray body preferably having a surrounding marginal lip 15 and a generally flat bottom wall 16. Each of the lower containers has a center divider wall 17 which is hollow and extends for the full length of the container between the end walls 18 thereof, with which the divider wall is integrally joined. The interior cavity of the hollow divider wall 17 opens through the bottom of each container as shown at 19 in FIGURE 2. The top web 20 of each hollow divider wall 17 is spaced somewhat below the open top of the particular container 11 or 12 and each divider wall 17 includes a central upstanding extension 21 above the web 20 which is open at its top as shown clearly in FIGURES 2 and 3.

Figure 3:
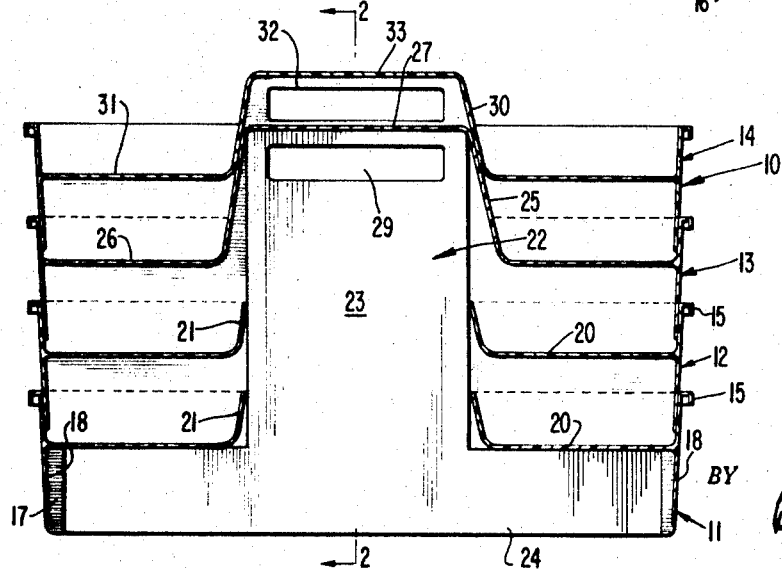
FIGURE 3 is a vertical section taken on line 3—3 of FIGURE 2.

A single handle structure 22 common to all containers in the assembly 10 is provided and comprises an inverted T-shaped member as shown in FIGURE 3 including a central upright rigid plate 23 of the required length and a bottom rigid cross member 24 which extends equidistantly on opposite sides of the plate 23. The cross member 24 engages inside of the hollow divider wall 17 of the lowermost receptacle 11 and substantially fills up the interior of this divider wall, as shown. The upright plate or portion 23 projects upwardly through and above the extensions 21 of the receptacles 11 and 12 and through any number of intermediate receptacles which may be provided in a particular assembly, the total number varying as previously explained.

Above the receptacle 12, which is the uppermost one of the identically constructed receptacles, a slightly modified receptacle 13 is included in the assembly, which differs from the underlying receptacles 11 and 12 only in that its central extension 25 of its hollow divider wall 26 extends upwardly above the top of the receptacle 13 for a considerable distance to form a lifting handle and the top of the extension 25 is closed by a horizontal web 27. The side walls of extension 25 are slotted at 28 to form a handle opening in registry with a similar slot 29 formed through the upright plate 23 near the top thereof and somewhat above the open top of receptacle 13. The plate 23 has its top end terminating at the web 27 and abutting this web as shown.

The topmost receptacle 14 of the container assembly nests within the receptacle 13 in the same manner that all of the underlying receptacles nest or stack. This topmost receptacle 14 is substantially identical to the next lowermost receptacle 13 and differs therefrom only in that the extension 30 of its central hollow divider wall 31 has a pair of handle slots 32 in vertically spaced relation. The upper slot 32 provides an independent carrying handle 33 for the top receptacle 14 when the same is separated from the stack. The lower slot 32 is in registry with the slots 28 and 29 of receptacle 13 and plate 23, respectively, and the lower slot 32 therefore constitutes part of the lifting or carrying handle means common to all of the receptacles making up the assembly or stack. The arrangement enables the uppermost receptacle 14 to be removed from the stack and used separately without destroying the integrity of the remainder of the stack and the remainder still having a single common carrying handle means afforded by the plate 23 and its handle slot 29 and the coacting slots 28 of the then uppermost container 13.

Each individual container of the assembly or stack constructed in accordance with the invention has a pair of compartments separated by the central divider wall 17, etc. When the containers are assembled, the bottom wall 16 of each forms an effective cover for the next lowermost container in the stack. Therefore, small parts and tools may be properly segregated and prevented from intermingling or becoming lost. If desired, the compartments on opposite sides of the center divider walls may be further broken down into sub-compartments by suitable partitions, not shown in the drawings.

In view of the above description, it is believed that the utility and advantages of the invention structure will be readily apparent without the necessity for any further description.

It is to be understood that the form of the invention herewith shown and described is to be taken as preferred example of the same, and that various changes in the shape, size and arrangement of parts may be resorted to.

I claim:

1. A plural container assembly comprising a plurality of tray-like receptacles arranged in stacked relation and being readily separable, each receptacle including a central hollow divider wall projecting above the bottom wall thereof, said hollow divider walls of plural lowermost containers in the stack having top openings, a single carrying handle member common to all of the receptacles, said carrying handle member projecting through said top openings of the hollow divider walls, at least one uppermost container in the stack having a slot formed through its divider wall to provide a lifting handle portion, and said carrying handle member having a slot substantially in registry with said divider wall slot.

2. The structure of claim 1, wherein said single carrying handle member is substantially inverted T-shaped including a central upright portion and a lower end cross member portion, said cross member portion being socketed within the interior of the hollow divider wall of the lowermost receptacle in the stack.

3. The structure of claim 1, wherein the body portions of the tray-like receptacles are somewhat tapered toward their bottoms and interfit telescopically when stacked and said central hollow divider walls tapering toward the tops of the receptacles and interfitting snugly telescopically when the receptacles are stacked, whereby the plural container assembly is rendered unitized and stable.

References Cited

UNITED STATES PATENTS

| | | |
|---|---|---|
| 959,489 | 5/1910 | Evans. |
| 2,821,327 | 1/1958 | Glazer _____ 220—102 |
| 3,211,326 | 10/1965 | Davis. |

GEORGE E. LOWRANCE, Primary Examiner

U.S. Cl. X.R.

220—102